(12) United States Patent
Bartkowska et al.

(10) Patent No.: US 8,273,399 B2
(45) Date of Patent: Sep. 25, 2012

(54) METHOD FOR MAKING COATED FROZEN CONFECTIONS

(75) Inventors: Beata Bartkowska, Sharnbrook (GB); Deborah Jane Towell, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 369 days.

(21) Appl. No.: 12/291,624

(22) Filed: Nov. 12, 2008

(65) Prior Publication Data

US 2009/0130264 A1    May 21, 2009

(30) Foreign Application Priority Data

Nov. 16, 2007   (EP) .................................... 07120876

(51) Int. Cl.
*A23G 9/00* (2006.01)
(52) U.S. Cl. ........................................ 426/565; 426/100
(58) Field of Classification Search .................. 426/89, 426/99, 100, 101, 565, 96
See application file for complete search history.

(56) References Cited

U.S. PATENT DOCUMENTS

| | | | |
|---|---|---|---|
| 1,949,835 A * | 3/1934 | James et al. ................ 426/289 |
| 2,207,034 A | 7/1940 | Vogel et al. |
| 2,433,140 A | 12/1947 | McCaughey |
| 3,036,533 A | 5/1962 | Burt et al. |
| 4,020,188 A | 4/1977 | Forkner |
| 6,242,022 B1 | 6/2001 | Bertrand et al. |
| 7,097,870 B2 | 8/2006 | Funk et al. |
| 2003/0203077 A1 | 10/2003 | Charles |
| 2004/0013771 A1 * | 1/2004 | Funk et al. ..................... 426/93 |
| 2004/0265472 A1 | 12/2004 | Corfman et al. |
| 2005/0002989 A1 * | 1/2005 | Palmer et al. ................ 424/439 |
| 2007/0065557 A1 * | 3/2007 | Pandey et al. ................ 426/572 |
| 2007/0104828 A1 * | 5/2007 | Fornaguera ...................... 426/3 |

OTHER PUBLICATIONS

Nilsen et al., Complete cake decorating, 1998, Lorenz books, page # 30 (total pages 3, including cover).*
European Search Report Application No. EP 07120876 dated Jun. 6, 2008.

* cited by examiner

*Primary Examiner* — Jyoti Chawla
(74) *Attorney, Agent, or Firm* — Michael P. Aronson (57) ABSTRACT

A process for making a coated frozen confection is provided, the process comprising: forming two sheets of coating material comprising particles and a binder, the binder comprising an aqueous solution of sweeteners of from 70 to 90° Brix; placing one or more frozen confection pieces onto the first sheet of coating material; then placing the second sheet of coating material on top of the frozen confection and first sheet; and shaping the second sheet around the frozen confection and pressing the second sheet onto the first sheet so that they are welded together to form a continuous coating. A coated frozen confection is also provided.

18 Claims, 5 Drawing Sheets

METHOD FOR MAKING COATED FROZEN CONFECTIONS

TECHNICAL FIELD OF THE INVENTION

The present invention relates to frozen confection products, such as ice cream. In particular it relates to a method for making products consisting of a core of frozen confection that is coated with dry particles such as pieces of cereal, biscuit, nut, seeds, dried fruit, muesli, granola, and the like.

BACKGROUND OF THE INVENTION

Frozen confections such as ice cream are popular products, but have a well-known disadvantage that they are rather messy and in particular cannot be held by hand without melting on the consumer's fingers. Therefore, frozen confections are not as convenient for eating on the move as other snack products such as chocolate bars or cereal bars.

In order to overcome this, frozen confections have been coated with dry particles (e.g. pieces of cereal, biscuit, nut etc.). For example U.S. Pat. No. 2,433,140 discloses a method wherein a block of ice cream is forced through a heated guide tube into a hopper containing nut pieces. The nut pieces adhere to the softened surface of the ice cream which is then refrozen to secure the pieces. Similarly, U.S. Pat. No. 3,036,533 discloses a method for applying a coating of particles to ice cream articles. The particles are thrown by air streams into contact with the soft, tacky surface of the ice cream and become imbedded in it. However, although these coatings provide a barrier between the consumer's fingers and the ice cream, the coatings remain as individual particles. The particles are liable to fall off and the coating does not provide any rigidity, so as the ice cream warms up, the product is still liable to be squashed by the consumer's fingers.

U.S. Pat. No. 6,242,022 discloses an alternative method for making a coated frozen confection product, by applying a fatty material to the surface of the frozen confection, cooling the fatty-coated product so that the fatty coating is tacky, applying cereal flakes onto the tacky fatty-coated surface so that the flakes adhere to the fatty layer. This method produces a continuous, rigid coating of chocolate in which cereal flakes are embedded. Nonetheless, the chocolate is still susceptible to melting when the product is in the consumer's fingers. Moreover the amount of chocolate required is quite high, and the amount of cereal flakes is quite low. Consumers are increasingly health conscious and are looking for products containing less fat. Therefore there remains a need for coated frozen confections that have improved nutritional qualities and are convenient to eat.

BRIEF DESCRIPTION OF THE INVENTION

We have now developed a process for making coated frozen confections with robust, nutritionally improved, non-messy and non-sticky sticky coatings. Accordingly, in a first aspect, the present invention provides a process for making a coated frozen confection, the process comprising:
  forming two sheets of coating material comprising particles and a binder, the binder comprising an aqueous solution of sweeteners of from 70 to 90° Brix;
  placing one or more frozen confection pieces onto the first sheet of coating material;
  placing the second sheet of coating material on top of the frozen confection and first sheet;
  shaping the second sheet around the frozen confection and pressing the second sheet onto the first sheet so that they are welded together to form a continuous coating.

The formulation of the first and second sheets must be carefully chosen to achieve the required flexibility, cohesion and weldability of the sheets. Furthermore, the coating material must not be sticky. We have found that binders having a Brix of from 70 to 90° meet these requirements.

Preferably the binder is 75 to 85° Brix, most preferably from 78 to 83° Brix.

Preferably the thickness of the sheets is 3-6 mm, more preferably 4-5 mm.

Preferably the frozen confection is extruded as a plurality of strips with gaps between them onto the first sheet of coating material.

Preferably the coating material comprises 55-80 wt % particles and 20-45 wt % binder; more preferably 60-75 wt % particles and 25-40 wt % particles.

Preferably the binder has a total solids content of from 60 to 95% (by weight of the binder), more preferably from 65 to 90%.

Preferably the binder comprises 1 to 15 wt % fat, more preferably 5-10% fat. Preferably the fat is dairy fat or coconut oil.

Preferably the binder also comprises 0.1 to 3 wt % emulsifier, more preferably from 0.5-1.5 wt %.

Preferably the binder comprises from 0.05 to 2 wt % stabiliser, more preferably from 0.1 to 1 wt %.

Preferably the binder comprises 0.1 to 2 wt % starch, more preferably from 0.2 to 1.5 wt %.

Preferably the particles are from 0.5 to 20 mm in size, more preferably from 1 to 15 mm, even more preferably from 2 to 10 mm, most preferably from 3 to 10 mm.

In a second aspect the present invention provides a coated frozen confection comprising a frozen confection core and a coating comprising particles and a binder, the binder comprising an aqueous solution of sweeteners of from 70 to 90° Brix.

Preferably the frozen confection core constitutes at least 50 wt % of the coated frozen confection, more preferably at least 60 wt %, most preferably at least 70 wt %.

In a third aspect the present invention provides products obtained and obtainable by the process of the first aspect of the invention.

DETAILED DESCRIPTION OF THE INVENTION

Unless defined otherwise, all technical and scientific terms used herein have the same meaning as commonly understood by one of ordinary skill in the art. All percentages, unless otherwise stated, refer to the percentage by weight, with the exception of percentages cited in relation to the overrun.

The coating material comprises particles held together with a binder.

The particles may be cereals (e.g. wheatflakes, branflakes, oats or barleyflakes); rice (e.g. grains or flaked rice); seeds (e.g. pumpkin seeds, sesame seeds or sunflower seeds); nuts (e.g. hazelnuts, pistachios); fruit pieces (e.g. dried cranberries, blueberries, apple, strawberries or raspberries); muesli, granola, biscuit and the like. Whole grain cereals are particularly preferred because of their nutritional properties.

The particles are suitably at least 0.5 mm in size (i.e. maximum diameter), preferably at least 1 mm, more preferably at least 2 mm, most preferably at least 3 mm. They are suitably less than 20 mm in size, preferably less than 15 mm, more preferably less than 10 mm, most preferably less than 5 mm.

The particles may be any shape, but are typically either flakes or approximately spherical. The shape and size of the particles affect the thickness of the sheet of coating material that is produced when the particles are combined with the binder. If the particles are approximately spherical, then it is preferred that they are at the smaller end of the size range (e.g. less than 10 mm or 5 mm) in order that the coating sheet is not too thick and/or that the particles are not squashed when the sheet is formed, which can result in a poorer appearance. In a preferred embodiment the particles are flakes, since large (e.g. 10-20 mm diameter) flakes nonetheless produce thin sheets because the flakes tend to lie in the plane of the sheet. Moreover, we have found that when flakes are used instead of spherical particles, less binder is required to produce a coating sheet having the required flexibility, i.e. a greater amount of healthy particles (seeds, nuts, fruit, cereals etc) can be incorporated.

The binder is a concentrated aqueous solution of one or more sweeteners, and may optionally contain other ingredients, such as fats, emulsifiers, stabilisers and starches. The majority of the solids in the binder are sweeteners. Preferably the binder has a total solids content of from 60 to 95% (by weight of the binder), more preferably from 65 to 90%. Correspondingly, the water content is from 5 to 40%, more preferably from 10-35%.

The composition of the binder determines the flexibility of sheet of coating material. The most important factor in determining the flexibility of the binder is the amount and type of sweetener. Sweeteners include mono- and disaccharides (such as sucrose, fructose, dextrose, and lactose); oligosaccharides containing from three to ten monosaccharide units joined in glycosidic linkage; corn syrups (preferably those with a dextrose equivalent (DE) of greater than 20, more preferably >40); maltodextrins; sugar alcohols (such as glycerol, sorbitol and malitol) and sugar replacers (such as polydextrose and oligofructose).

The sweetener content of a binder can be conveniently expressed in terms of ° Brix. Degrees Brix is a measurement of the mass ratio of dissolved sweetener to water in a solution. A 25° Brix solution is 25% (w/w), with 25 g sucrose per 100 g solution (i.e. 25 g sucrose and 75 g water). Brix is measured using a refractometer (Eclipse handheld refractometer from Bellingham & Stanley Ltd). If the binder contains fat, then the ° Brix refers to the value measured in the absence of fat, e.g. measured before fat is added into the binder mix. The higher the ° Brix, the greater the sweetener content. As the sweetener content of the binder is increased, the coating material becomes more flexible and less firm and brittle during processing. However, if the sweetener content is too high, the coating material becomes sticky/tacky and therefore unsuitable for being held in the consumer's hand. The binder has a ° Brix of at least 70, more preferably at least 75, most preferably at least 78; and preferably at most 90, more preferably at most 85, most preferably at most 83. If the binder is too brittle and dry, it can be made more flexible and cohesive by increasing the Brix (i.e. increasing the sweetener concentration) and/or decreasing the molecular weight of the sweeteners, e.g. by using dextrose instead of sucrose, or by using a high DE corn syrup instead of a low DE one.

The binder may comprise one or more fats or oils, such as dairy fat, coconut oil, palm oil, palm kernel oil, soybean oil, rapeseed oil and sunflower oil, and fractions or blends thereof. Preferably the fat is dairy fat or coconut oil, since we have found that binders containing dairy fat or coconut oil result in coating materials which can be formed into non-sticky, uniform, flexible thin sheets at convenient temperatures (e.g. 40-45° C.). If a lower forming temperature is used liquid oils, such as sunflower oil, are preferred in order that the coating material remains flexible. Preferably the fat is present in a total amount of from 1 to 15 wt %, more preferably from 5-10 wt %. We have found that the presence of fat in these amounts results in a binder which with increased flexibility and cohesion. When the binder contains fat, then it preferably also comprises one or more emulsifiers, such as mono- and di-glycerides of saturated or unsaturated fatty acids, milk proteins, lecithin and egg yolk. Preferably the emulsifier is present in a total amount of from 0.1 to 3 wt %, more preferably from 0.5-1.5 wt %. Emulsifiers help to prevent separation of the fat from the rest of the binder.

The binder may also comprise one or more stabilisers, such as locust bean gum, guar gum, agar, alginate, carrageenan, pectin, carboxymethyl cellulose, microcrystalline cellulose, gelatine, dextran and xanthan. Preferably the stabiliser is present in a total amount of 0.05 to 2 wt %, more preferably from 0.1 to 1 wt %. The presence of stabiliser results in a binder which is less brittle and more cohesive.

The binder may also comprise starch, preferably a native (unmodified) starch such as potato starch. Preferably the starch is present in a total amount of 0.1 to 2 wt %, more preferably from 0.2 to 1.5 wt %. The presence of starch results in a binder which is more flexible and cohesive, less brittle and less sticky.

It is also possible to aerate the binder, i.e. to incorporate small air bubbles, which increases the volume of the binder, so that the amounts of sweetener/fat etc. required are reduced. Aeration is believed to result in binders that are less sticky. If it is desired to aerate the binder, a whipping agent such as hydrolysed milk protein, egg white, or soy protein is preferably included in the binder formulation. Aeration may be achieved by any suitable aeration device and may be either a batch process or a continuous process.

The binder can be prepared by any suitable method. In a preferred method, the binder is initially formulated with extra water which helps to dissolve the dry ingredients, and which is subsequently removed by evaporation. First the water is heated to boiling point. The sweeteners, stabilisers, starch and whipping agent (if required) are mixed in with stirring and the mixture is boiled so that the water content is reduced by evaporation until the required ° Brix is reached. It is important to control the temperature and time of cooking to avoid inversion of sugar and to prevent burning. The fat and emulsifiers are then melted and blended into the mixture.

Alternatively, the binder can be prepared in a single step by adding the sweeteners, stabilisers and starch into the correct amount of hot water (70° C.) with stirring, followed by the melted fat/emulsifier. This process has the advantage that boiling is not required, but it can be harder to dissolve the dry ingredients, especially for binders having Brix values at the higher end of the range.

The coating sheet is produced by combining the particles and the binder for example in a mixer or a screw extruder. The coating suitably comprises 55-80 wt % particles, preferably 60-75 wt % and 20-45 wt % binder, preferably 25-40 wt %. Large amounts of healthy particles (e.g. fruit, seeds, nuts, cereals etc) result in products with improved nutritional properties. The binder should be hot (e.g. at a temperature of from 40 to 90° C., preferably from 70-85° C.) during the mixing step, and the particles are typically at room temperature.

Once the particles and binder have been combined to form the coating material, it is formed into sheets. For example, the mixed binder and particles are fed from a hopper to a sheet former (such as the Bepex Hutt Cereal Bar Forming Line), which forms a sheet of a chosen thickness by passing the material through rollers. The rollers compress the coating material thereby creating a cohesive, self-supporting sheet. Increasing the compressive force applied by the rollers increases the cohesion of the sheet. Preferably the thickness of the sheet is 3-6 mm, more preferably 4-5 mm. The coating material is typically above room temperature (e.g. 30-50° C., preferably 40-45° C.) so that it remains malleable/flexible/formable. Heating the rollers increases the temperature of the coating material, so that the sheet is more flexible. The sheet of coating material comes out of the sheet former onto e.g. a conveyor belt.

This type of process is known in the art, e.g. for making cereal bars. U.S. Pat. No. 7,097,870 discloses a method of making cereal bars wherein two such sheets are produced, a sheet of cream or fruit filling is dispensed onto the first cereal sheet, and the second cereal sheet is placed on top to form a sandwich. The sandwich is then cut into ribbons by a slitter (e.g. a rotating blade) and the ribbons are cut into individual bars to form the final product. Whilst the process is suitable for fillings that are stable at ambient temperature, it is not suitable for frozen confection fillings, such as ice cream, sorbet, sherbet, water ice or frozen yoghurt. The products would lack rigidity and be liable to be squashed by the consumer's fingers and drip out as the ice cream warms up. Furthermore, cream/fruit fillings are soft, so the filling layer has to be quite thin in this process. However, we have now found that it is possible to make products with a frozen confection filling provided that the frozen confection is placed onto the first (lower) coating sheet in one or more strips (rather than a continuous layer), and provided that the properties of the coating sheets are carefully chosen.

The present invention will now be further described with reference to the figures wherein.

Figure 1:
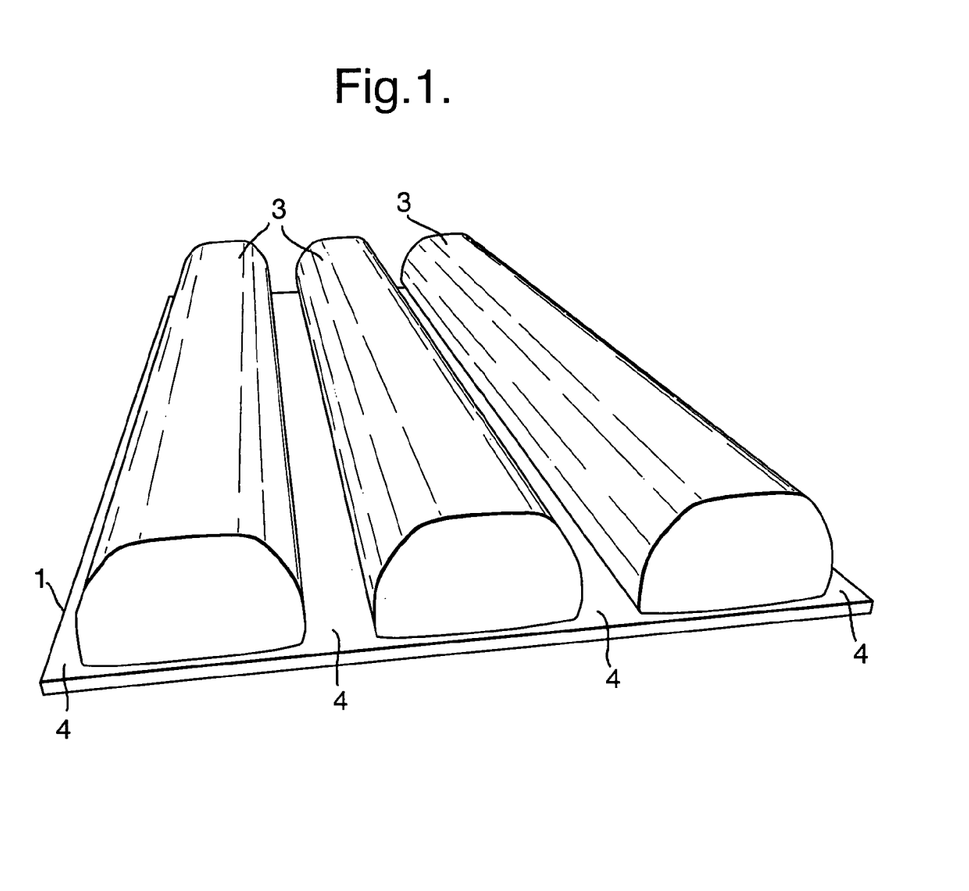
FIG. 1 shows the first sheet of coating material onto which strips of frozen confection have been placed.

FIG. 1 shows a first sheet of coating material 1 (produced as described above) onto which one or more strips of frozen confection 3 have been placed, with gaps 4 between them and at the edges of the first sheet. Typically the ice cream strips are of a suitable size for a bar product, such as from 10 to 40 mm in width and height.

Figure 2:
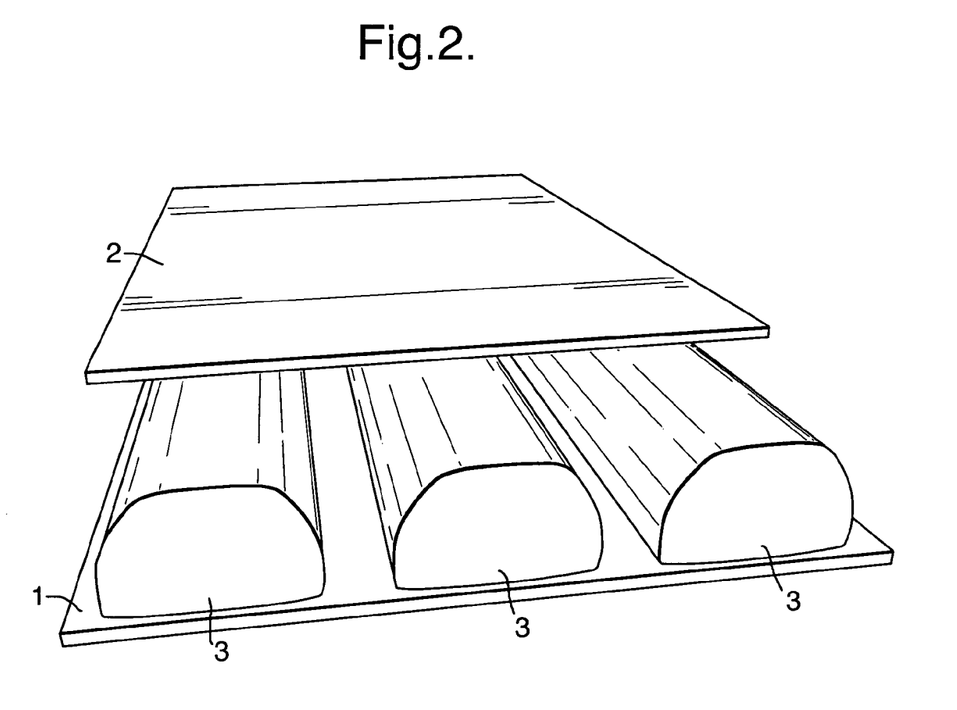
FIG. 2 shows the second sheet of coating material placed on top of the frozen confection.

As shown in FIG. 2, a second sheet of coating material 2 is then placed on top of the frozen confection 3. The second sheet of coating material (also produced as described above) may be of the same composition as the first sheet, or may be of a different composition (different binder and/or particles) and/or a different thickness.

Figure 3:
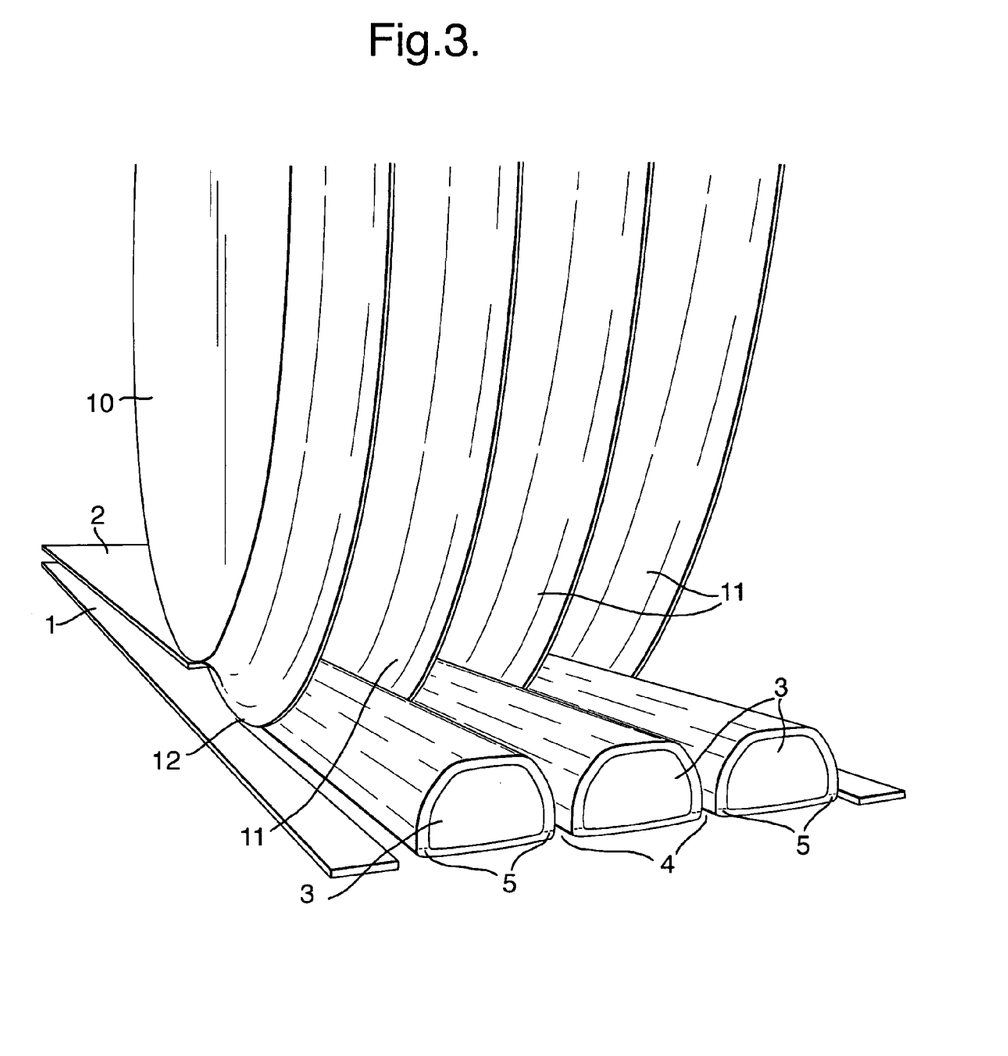
FIG. 3 shows the coating sheets and frozen confection passing through the shaping roller.
Figure 4:
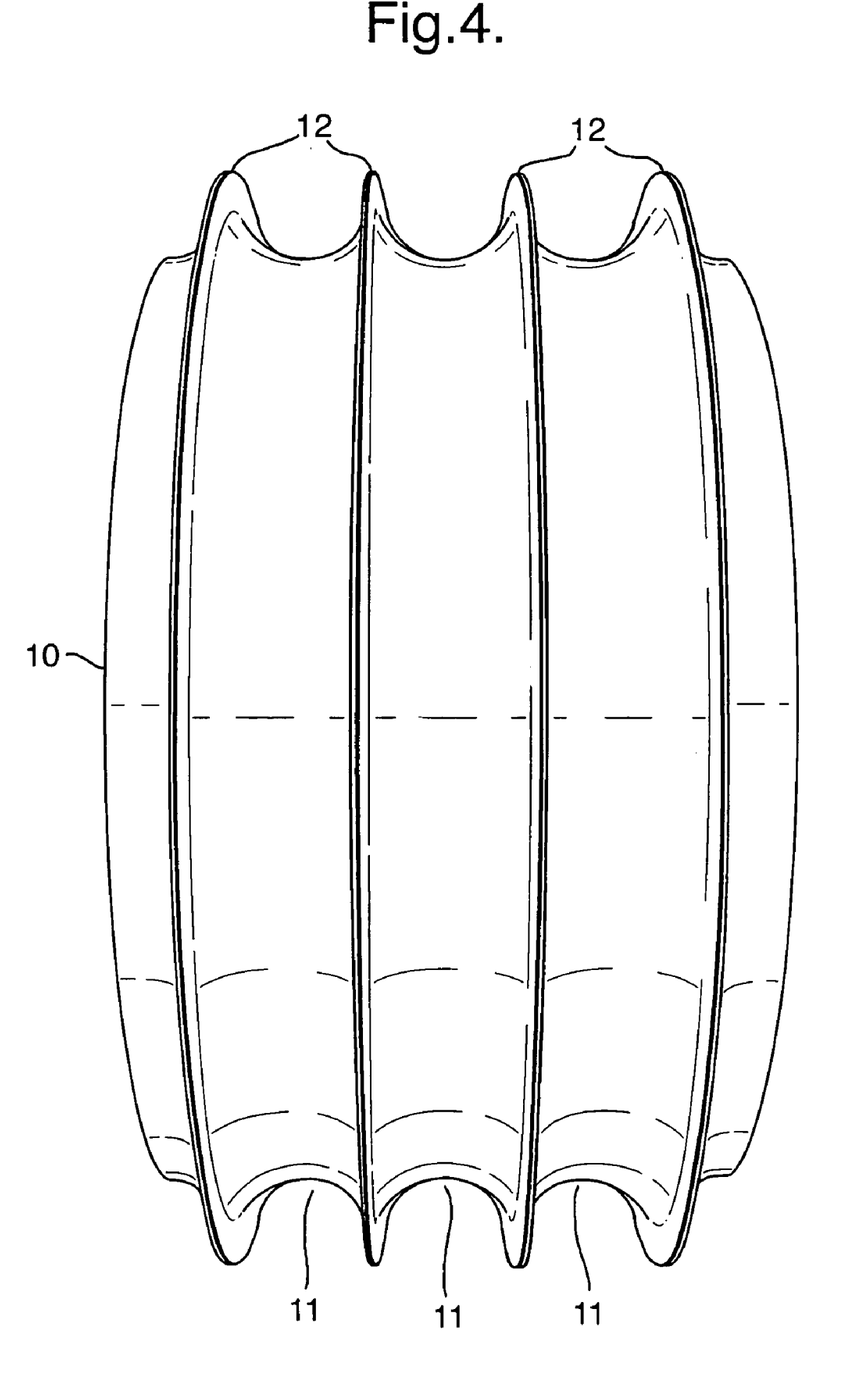
FIG. 4 shows the shaping roller in profile.

FIG. 3 shows the next stage in the process in which the coating sheets and frozen confections are passed through a shaping roller 10. The roller 10 is shown in profile in FIG. 4. It has concave grooves 11 that are separated by ridges 12. It is seen from FIGS. 3 and 4 that the ridges 12 separating the concave grooves 11 are perpendicular to a rotational axis (not shown) of the shaping roller 10. The grooves are typically curved or triangular in cross-section in order to shape the second coating sheet. The depth of the grooves corresponds to the height of the frozen confection together with the thicknesses of the two coating sheets. The width of the grooves corresponds to the width of the frozen confection together with half the gap on either side.

As shown in FIG. 3, the second (upper) coating sheet 2 is shaped around the frozen confections 3 as it passes under the roller 10 by the grooves 11. At the same time the ridges 12 press the second sheet 2 onto the first sheet 1 on either side of the frozen confection 3 thereby forming welds 5 that join the first 1 and second 2 sheets together. The ridges 12 cut through the first and second coating sheets to separate the coated frozen confection cores. The gaps 4 should not be so small so that the second sheet has to stretch by a large amount in order to wrap around the top and side surfaces of the frozen confection. Preferably, the frozen confections are 15-20 mm in height, 20-30 mm in width, with a gap of 5-10 mm between them. The second sheet must be sufficiently flexible and elastic that it can be shaped around the frozen confection and welded to the first sheet. For this reason, the roller 10 is preferably heated to a temperature of 40-50° C.

In order to produce a product with the correct balance between the amounts of coating and frozen confection, the first and second sheets must be quite thin, preferably 3-6 mm. The combination of flexibility/elasticity and thickness requires that the second coating sheet, in particular the binder, has the correct properties, so that it does not tear during the shaping step.

The frozen confection must be sufficiently firm that the second sheet can be shaped around it without the frozen confection being squashed and therefore leaking out. Thus the frozen confection is preferably at a temperature below −5° C., more preferably at −7° C. or below, most preferably below −9° C. In order to achieve low temperatures the frozen confection may be hardened (e.g. by blast freezing) before the coating process. In a preferred embodiment, the frozen confection is produced by low temperature extrusion, so that frozen confection can be produced continuously and extruded onto the first (lower) coating sheet at a sufficiently low temperature. Low temperature extrusion is described for example in R. T. Marshall, et al, Ice Cream, $6^{th}$ Edition, page 190 and "The Science of Ice Cream", C. Clarke, pages 81-82. In low temperature extrusion, aerated, partially frozen ice cream leaves the ice cream freezer and is passed through a screw extruder as it is cooled to typically −15° C. The extruder applies a higher shear stress (and lower shear rate) to the ice cream than a conventional freezer, which means that it can operate at low temperatures when the ice cream has very high viscosity. However, if the frozen confection is specially formulated, or is unaerated or has low overrun (e.g. below 30%), then it may be firm enough at a temperature of about −5° C.

After the strips of coated frozen confection have been formed by the roller, static knives may be used to ensure separation of the strips. The strips may optionally be cooled (e.g. in a hardening tunnel) and then cut transversely, e.g. with an ultrasonic cutter or a knife to produce individual products. The products may then be cooled, packaged and stored.

Figure 5:
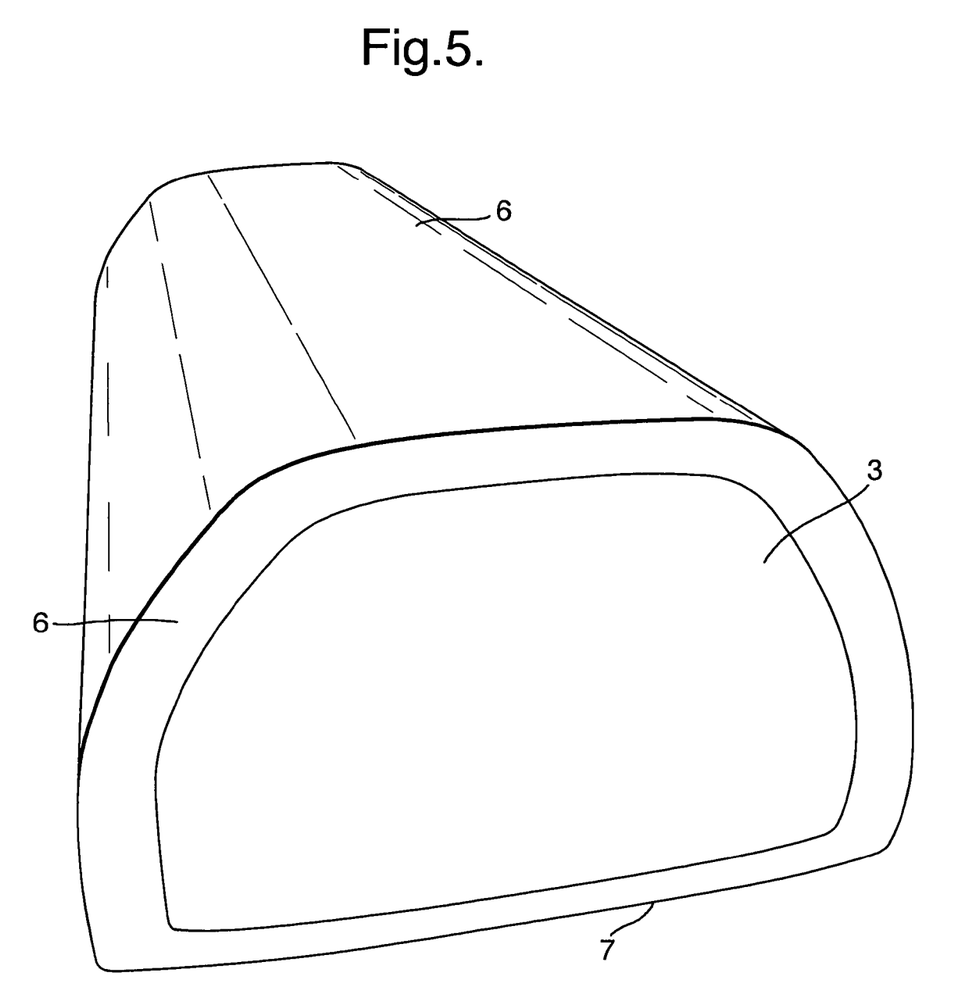
FIG. 5 shows the final product.

The resulting coated products shown in FIG. 5 comprise a frozen confection core 3 and a coating 6 of particles and binder formed from the first and second sheets. Preferably the frozen confection core constitutes at least 50 wt % of the coated product (and correspondingly the coating material constitutes at most 50 wt % of the coated product) in order that the product has the desired balance between the amounts of coating and frozen confection. The greater the proportion of coating material, the greater the amount of healthy particles (e.g. nuts, seeds, cereals, fruit etc) that can be incorporated. Coated does not mean that the frozen confection has to be completely surrounded by the coating material. The coating material covers at least the sides of the frozen confection, but not necessarily the ends. For example in the process described above, cutting the strips transversely results in bar products with coated sides, and uncoated ends 7.

The present invention will now be further described with reference to the following examples which are illustrative only and non-limiting:

EXAMPLES

Example 1

Particle Blends

Seven example particle blends are shown in Table 1 (the amounts are given as weight percentage of the particle blend). The particles were in the size range 3-5 mm.

TABLE 1

| Ingredient | 1 | 2 | 3 | 4 | 5 | 6 | 7 |
|---|---|---|---|---|---|---|---|
| Museli | 40 | 40 | 40 | | | | |
| Wheatflakes | 40 | | 35 | 25 | 30 | 30 | 22 |
| Branflakes | | 40 | | | | | |
| Oats | | | | 15 | 20 | 20 | 29 |
| Riceflakes | | | | 25 | | | |
| Barleyflakes | | | | 25 | 30 | 30 | |
| Pumpkin seeds | | | 5 | | | | |
| Sunflower seeds | | | 5 | | | | |
| Toasted sesame seeds | | | 5 | | | | 7 |
| Hazelnuts | | | | 10 | | | |
| Chopped pistachio nuts | | | | | | | 13 |
| Dried Cranberries | 20 | 20 | 10 | | 20 | | |
| Dried Blueberries | | | | | | 5 | |
| Dried Strawberries | | | | | | 5 | |
| Dried Raspberries | | | | | | 5 | |
| Dried Apple | | | | | | 5 | 29 |

Example 2

Binders

Seven example binder formulations are shown in table 2. These are given in terms of the initial binder composition before the amount of water is reduced by cooking. The binders were produced heating the water to boiling point, then mixing in the sweeteners, stabiliser and starch (where present) and boiling the mixture with stirring so that water evaporated until 78° Brix was reached. The fat and emulsifier were then melted and blended into the mixture. The formulations are variants demonstrating the use of different sweeteners, fats and a stabiliser. All the binders gave suitable coating sheets when combined with particles in the process described above.

TABLE 2

| Ingredient (g) | 1 | 2 | 3 | 4 | 5 | 6 | 7 |
|---|---|---|---|---|---|---|---|
| Water | 125.4 | 125.4 | 114.5 | 125.4 | 125.4 | 125.4 | 125.4 |
| 17-18 DE maltodextin | 58.5 | | | 58.5 | 58.5 | 58.5 | 58.5 |
| 28 DE Corn syrup solids | | 58.5 | 70 | | | | |
| 42DE Corn syrup | 154.6 | 154.6 | 200 | 154.6 | 154.6 | 154.6 | 154.6 |
| Sucrose | 98.1 | 98.1 | 50 | 98.1 | 98.1 | 98.1 | 98.1 |
| Dextrose | 15 | 15 | 15 | 15 | 15 | 15 | 15 |
| Starch | 7.5 | 7.5 | 7.5 | 7.5 | 7.5 | 7.5 | 7.5 |
| Locust bean gum | | | | 1 | | | |
| Coconut oil | 35.5 | 35.5 | 35.5 | 35.5 | | | |
| Palm oil | | | | | 35.5 | | |
| Rapeseed oil | | | | | | 35.5 | |
| Butter oil | | | | | | | 35.5 |
| Monodiglyceride emulsifier | 5 | 5 | 7.5 | 5 | 5 | 5 | 5 |

Example 3

Binders

Five further example binder formulations are shown in table 3. These are again given in terms of the initial binder composition before water is removed. The binders were produced as described in example 2.

TABLE 3

| Ingredient (g) | 8 | 9 | 10 |
|---|---|---|---|
| Water | 26.4 | 22.7 | 28.2 |
| 17-18DE maltodextrin | 11.8 | 11.8 | 12.8 |
| 42DE corn syrup | 31.3 | 31.3 | 33.5 |
| Sucrose | 19.8 | 19.8 | 21.3 |
| Dextrose | 3.0 | 3.0 | 3.2 |
| Starch | | 3.7 | 1.1 |
| Coconut Oil | 7.2 | 7.2 | |
| Monodiglyceride emulsifier | 0.56 | 0.56 | |

Binder 8 was made in two batches, one at 83° Brix and one at 86° Brix. Binder 9 was made at 78° Brix and 85° Brix. Binder 10 was made at 78° Brix. All the binders gave suitable coating sheets when combined with particles.

Example 4

Binder Made in One-Step Process

A further binder was made in a one-step process, using the formulation given in Table 4. In this case, water was not removed by evaporation. The resulting binder was 75° Brix and gave suitable coating sheets when combined with particles.

TABLE 4

| Ingredient (g) | 19.3 |
|---|---|
| Water | 19.3 |
| 28 DE corn syrup | 17.0 |
| 40 DE corn syrup solids | 24.7 |
| Dextrose | 3.0 |
| Sucrose | 19.6 |
| Starch | 1.5 |
| Coconut oil | 7.1 |
| Monodiglyceride emulsifier | 1.0 |

Example 5

Coated Frozen Confection Product

A coating material was made by combining 73% of particle blend 7 from example 1 with 27% binder formulation 8 from example 3, and formed into sheets of approximately 4 mm thickness. A standard ice cream mix was frozen and aerated (80% overrun) to produce ice cream bars (25 mm wide by 17 mm high by 80 mm long) at a temperature of about −7° C. The ice cream bars were coated by the process described above. The resulting coated ice cream bar was not sticky or messy when held in the hand during consumption.

The various features and embodiments of the present invention, referred to in individual sections above apply, as appropriate, to other sections, mutatis mutandis. Consequently features specified in one section may be combined with features specified in other sections, as appropriate.

All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. A process for making a coated frozen confection, the process comprising:
   (a) forming two sheets of coating material comprising particles having a size of at least 1 mm and a binder comprising an aqueous solution of sweeteners, wherein said binder has a solids content of 60% to 95% based on the total weight of binder and has a Brix value of 70 to 90°, and wherein the sheets have a thickness of 3-6 mm and edges;
   (b) extruding a plurality of strips of frozen confection onto the first sheet of coating material such that there are gaps between the strips and at the edges of the first sheet;
   (c) placing the second sheet of coating material on top of the plurality of strips of frozen confection and the first sheet;
   (d) shaping the second sheet around each of the strips of frozen confection by passing the coating sheets and strips of frozen confection through a shaping roller having concaved grooves that are separated by ridges, said grooves having a depth corresponding to the height of each of the frozen confection strips together with the thickness of the two coating sheets and a width corresponding to the width of each of the frozen confection strips together with half the gap on either side of the strip thereby pressing the second sheet onto the first sheet so that the top and bottom sheets are welded together to form a continuous coating on each strip of frozen confection.

2. A process according to claim 1 wherein the binder is 75 to 85° Brix.

3. A process according to claim 1 wherein the coating material comprises 55-80 wt % particles and 20-45 wt % binder.

4. A process according to claim 1 wherein the binder comprises 1 to 15 wt % fat.

5. A process according to claim 4 wherein the fat is dairy fat or coconut oil.

6. A process according to claim 1 wherein the binder comprises 0.1 to 3 wt % emulsifier.

7. A process according to claim 1 wherein the binder comprises from 0.05 to 2 wt % stabiliser.

8. A process according to claim 1 wherein the binder comprises 0.1 to 2 wt % starch.

9. A process according to claim 1 wherein the particles are from 1 to 20 mm in size.

10. The process according to claim 1 wherein the binder is a concentrated aqueous solution of one or more sweeteners, and may optionally contain other ingredients; and wherein said binder has a water content of from 5 to 40%.

11. The process according to claim 10 wherein the other ingredients are fats or emulsifiers or stabilisers or starches.

12. The process according to claim 11 wherein the fat is present at 0.1 to 15 wt %, wherein the emulsifier is present at 0.1 to 3 wt %, wherein the stabiliser is present at 0.05 to 2 wt %; and wherein the starch is present at a level of 0.1 to 2 wt %.

13. The process according to claim 1 further comprising the step of cutting the strips transversely to produce bar products having coated sides and uncoated ends.

14. The process according to claim 1 wherein the binder comprises sucrose, dextrose and either corn syrup, maltodextrin or a mixture of corn syrup and maltodextrin.

15. The process according to claim 1 wherein the ridges separating the concave grooves are perpendicular to a rotational axis of the shaping roller.

16. A coated frozen confection comprising a frozen confection core and a coating having a thickness of 3-6 mm comprising particles having a size of at least 1 mm and a binder having a solids content of 60% to 95% based the total weight of binder and comprising an aqueous solution of sweeteners, wherein said binder has a Brix value of 70 to 90°.

17. A coated frozen confection according to claim 16 wherein the frozen confection core constitutes at least 50 wt % of the coated frozen confection.

18. The coated frozen confection according to claim 16, wherein the binder comprises sucrose, dextrose and either corn syrup, maltodextrin or a mixture of corn syrup and maltodextrin.

* * * * *